(12) United States Patent  
Lee

(10) Patent No.: US 10,988,111 B2  
(45) Date of Patent: Apr. 27, 2021

(54) USER IDENTIFICATION METHOD AND APPARATUS USING LEVER-TYPE DOOR GRIP PATTERN RECOGNITION

(71) Applicants: Hyundai Motor Company, Seoul (KR); Kia Motors Corporation, Seoul (KR)

(72) Inventor: Seung Hwan Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 787 days.

(21) Appl. No.: 15/723,654

(22) Filed: Oct. 3, 2017

(65) Prior Publication Data

US 2018/0162320 A1    Jun. 14, 2018

(30) Foreign Application Priority Data

Dec. 14, 2016 (KR) .................. 10-2016-0170494

(51) Int. Cl.  
*B60R 25/25* (2013.01)  
*B60R 25/20* (2013.01)  
(Continued)

(52) U.S. Cl.  
CPC .......... *B60R 25/2081* (2013.01); *B60R 16/02* (2013.01); *B60R 16/037* (2013.01); *B60R 25/01* (2013.01); *B60R 25/25* (2013.01); *B60R 25/252* (2013.01); *G01D 5/26* (2013.01); *G01L 5/12* (2013.01); *G06K 9/00382* (2013.01); *G07C 9/37* (2020.01); *B60N 2/0228* (2013.01); *B60N 2/0248* (2013.01); *B60W 50/0098* (2013.01); *B60W 2540/043* (2020.02); *G06K 2009/00395* (2013.01); *G07C 9/00309* (2013.01); *G07C 2009/00507* (2013.01)

(58) Field of Classification Search  
CPC ... B60R 25/2081; B60R 16/02; B60R 16/037; B60R 25/01; B60R 25/25; B60R 25/252; G07C 9/37; G01D 5/12; G01D 5/26  
See application file for complete search history.

(56) References Cited

U.S. PATENT DOCUMENTS

2003/0222759 A1* 12/2003 Amagasa ........... G07C 9/00309  
340/5.72  
2006/0232378 A1* 10/2006 Ogino ................... B60R 25/246  
340/5.62

(Continued)

FOREIGN PATENT DOCUMENTS

JP      2005-098016 A       4/2005  
KR   10-2014-0047989 A      4/2014  
KR   10-2014-0148207 A     12/2014

*Primary Examiner* — Nabil H Syed  
(74) *Attorney, Agent, or Firm* — Mintz Levin Cohn Ferris Glovsky and Popeo, P.C.; Peter F. Corless

(57) ABSTRACT

A user identification method and apparatus using recognition of a grip pattern of a lever-type door are provided. The user identification method using recognition of a grip pattern of a lever-type door includes activating a sensing module disposed within a lever of a vehicle door when a smart-key is sensed. A grip pattern is then sensed using the sensing module and a user profile that corresponds to the grip pattern is identified. A user-customization module is activated in response to the identified user profile.

24 Claims, 7 Drawing Sheets

(51) Int. Cl.
*G06K 9/00* (2006.01)
*G01L 5/12* (2006.01)
*B60R 16/037* (2006.01)
*G01D 5/26* (2006.01)
*B60R 25/01* (2013.01)
*B60R 16/02* (2006.01)
*G07C 9/37* (2020.01)
*B60W 50/00* (2006.01)
*B60N 2/02* (2006.01)
*G07C 9/00* (2020.01)

(56) References Cited

U.S. PATENT DOCUMENTS

| | | | |
|---|---|---|---|
| 2010/0268537 A1* | 10/2010 | Al-Telmissani | G10L 17/04 704/246 |
| 2014/0070917 A1* | 3/2014 | Protopapas | B60R 25/25 340/3.1 |
| 2015/0360567 A1* | 12/2015 | Sannomiya | G06F 3/04883 345/174 |
| 2017/0101076 A1* | 4/2017 | Krishnan | E05B 81/78 |
| 2018/0018179 A1* | 1/2018 | Scheufler | H04W 12/0608 |

* cited by examiner

… (1) …

USER IDENTIFICATION METHOD AND APPARATUS USING LEVER-TYPE DOOR GRIP PATTERN RECOGNITION

CROSS-REFERENCED TO RELATED APPLICATION(S)

This application claims the benefit of Korean Patent Application No. 10-2016-0170494, filed on Dec. 14, 2016, which is hereby incorporated by reference as if fully set forth herein.

BACKGROUND

Field of the Invention

The present invention relates to a user identification method and, more specifically, to a user identification method and apparatus using a lever grip pattern.

Discussion of the Related Art

A driver is capable of adjusting various types of electronic parts within a vehicle (e.g., a driver seat position, a side mirror angle, etc.), which may be set differently based on a driver body type, driving habit or the like. Such adjustment is a prerequisite for safe driving. In addition, a driver is also capable of inputting information necessary to execute functions of an audio video navigation (AVN) system to set a previously used multimedia utilization environment.

Furthermore, vehicle sharing services are becoming popular according to a social atmosphere in which the sharing economy is growing. One vehicle may be used by multiple drivers, and thus it may be inconvenient for users to adjust a driver seat position suited to their body types or to change setting of an AVN system before driving the vehicle. A driver may automatically adjust a driver seat position fitted to a previously registered driver through a user interface (UI) of an integrated memory system (IMS). Referring to FIG. 1, driver seat positions may be set for two previously registered drivers through the IMS.

However, a driver needs to input information regarding the user into the IMS and notify the system which one of registered drivers corresponds to the user even when the IMS is used and is required to repeat a procedure of notifying various electronic parts other than the IMS which one of registered drivers corresponds to the driver, which is inconvenient for the driver. Furthermore, it is inconvenient for the driver to perform a procedure of setting or identifying the driver for various electronic systems through an arbitrary operation (e.g., input through a button). Accordingly, there is a demand for a method for controlling an electronic system to identify a plurality of drivers and adjusting setting values for identified drivers without an additional operation when a driver enters a vehicle.

SUMMARY

The present invention provides a user identification method and apparatus through recognition of a lever-type door grip pattern. In particular, the present invention provides a user identification method and apparatus through recognition of a lever-type door grip pattern to identify a driver using information obtained using a sensor and to automatically adjust electronic systems which may be set differently according to drivers prior to driving the vehicle depending on the identified driver without additional operations performed on the electronic system.

It will be appreciated by persons skilled in the art that the objects that could be achieved with the present invention are not limited to what has been particularly described hereinabove and the above and other objects that the present invention could achieve will be more clearly understood from the following detailed description.

A user identification method using recognition of a grip pattern of a lever-type door according to an exemplary embodiment of the present invention may include: activating a sensing module of a lever when a smart-key is detected; sensing a grip pattern using the sensing module; identifying a user profile that corresponds to the grip pattern; and activating a user-customization module in response to the identified user profile.

The activating of the sensing module may include: in response to detecting the smart-key, operating the lever-type door in a standby state; and activating the sensing module of the lever when the lever-type door is in the standby state. The identifying of a user profile that corresponds to the grip pattern may include: searching for at least one previously registered user profile using the grip pattern; and outputting a user profile matched to the grip pattern from among searched user profiles.

The grip pattern may include at least one of a grip image pattern, a lever pulling time, a lever release time, a lever pulling direction and a lever pulling speed. The sensing module may include a plurality of contact sensors arranged at specific intervals on a sensor board mounted in the lever. The sensor board may be arranged on the surface of the lever. The contact sensors may include at least one of a capacitive touch electrode sensor, a resistive sensor and an optical sensor. The contact sensors may be arranged at specific intervals in a grid form.

The grip image pattern may be transformed from coordinates of multi-touched contact sensors from among the plurality of contact sensors and formed on a two-dimensional (2D) plane. The grip image pattern may include at least one sub-grip image pattern according to a combination of a plurality of fingers and a palm touches. The identifying of the user profile may include comparing each grip pattern stored in the at least one previously stored user profile with the sensed grip pattern and identifying the user profile as the corresponding user profile when a deviation between the grip patterns is less than a threshold value.

The user identification method may further include adding the sensed grip pattern to the previously stored user profile or registering the sensed grip pattern as a new user profile when the deviation between each grip pattern stored in the at least one previously registered user profile and the sensed grip pattern is greater than the threshold value. Further, the lever-type door may be a vehicle door and the lever may be an exterior handle mounted on the vehicle door. The activating of the user-customization module may include operating at least one electronic system of the vehicle having differently set values for different users, included in user profiles, in response to a previously registered user profile.

The operating of at least one electronic system having differently set values for different users, included in user profiles, in response to a previously registered user profile may include adjusting at least one of a vehicle seat position, a driving mode input to the user profile from among at least one driving mode, a height or angle of a steering wheel, a side-view mirror angle, brightness or color output of a cluster, a brightness output or position of a heads up display (HUD), preset radio channels and a bookmark or an address book of an AVN system.

The user-customization module may be an integrated memory system (IMS). The lever pulling time may be a time from when the lever is gripped by the user to when the lever is pulled, and the lever release time may be a time from when the lever is pulled to when the lever is released. The lever pulling speed may be a ratio of the lever pulling time to a reference time.

The lever pulling direction may be one of an upward direction, a downward direction, a horizontal direction and diagonal directions based on the lever design. The user identification method may further include outputting a message that indicates completion of activation of the user-customization module through an output module of an AVN system. The user identification method may further include comparing each grip pattern stored in the at least one previously registered user profile with the sensed grip pattern and inputting the sensed grip pattern as a new user profile using a user interface of an AVN system when a deviation between the grip patterns is greater than a threshold value.

The present invention also provides a non-transitory computer readable recording medium configured to store a program for executing the method. Additionally, a lever-type door device according to an exemplary embodiment of the present invention may include: a sensing module configured to sense a grip pattern; and a controller configured to identify a user profile that corresponds to the grip pattern and to activate a user customization module in response to the identified user profile, wherein the controller may be configured to activate the sensing module of a lever when a smart-key is detected.

The lever-type door device may further include a communication unit configured to receive a smart-key sensing signal from a smart-key system, wherein the controller may be configured to operate a lever-type door to enter a standby state and activate the sensing module in the standby state when the smart-key sensing signal is received. The controller may further be configured to search for at least one previously registered user profile using the grip pattern and output a user profile matched to the grip pattern from among searched user profiles. The grip pattern may include at least one of a grip image pattern, a lever pulling time, a lever release time, a lever pulling direction and a lever pulling speed.

Further, the sensing module may include a plurality of contact sensors arranged at specific intervals on a sensor board mounted in the lever. The sensor board may be arranged on the surface of the lever. The contact sensors may include at least one of a capacitive touch electrode sensor, a resistive sensor and an optical sensor. The contact sensors may be arranged at specific intervals in a grid form. The grip image pattern may be transformed from coordinates of multi-touched contact sensors from among the plurality of contact sensors and formed on a 2D plane. The grip image pattern may include at least one sub-grip image pattern according to a combination of a plurality of fingers and a palm touches.

The controller may be configured to compare each grip pattern stored in the at least one previously stored user profile with the sensed grip pattern and identify the user profile as the corresponding user profile when a deviation between the grip patterns is less than a threshold value. The lever-type door device may further include a grip pattern database (DB) for adding the sensed grip pattern to the previously stored user profile or registering the sensed grip pattern as a new user profile when the deviation between each grip pattern stored in the at least one previously registered user profile and the sensed grip pattern is greater than the threshold value.

The lever-type door may be a vehicle door and the lever may be an exterior handle mounted on the vehicle door. The controller may be configured to transmit control information to at least one electronic system having differently set values for different users, included in user profiles, in response to a previously registered user profile. The user-customization module may adjust at least one of a vehicle seat position, a driving mode input to the user profile from among at least one driving mode, a height or angle of a steering wheel, a side-view mirror angle, a rearview mirror angle, brightness or color output of a cluster, a brightness output or position of a heads up display (HUD), preset radio channels and a bookmark or an address book of an AVN system in response to the user profile.

In particular, the user-customization module may be an IMS. The lever pulling time may be a time from when the lever is gripped to when the lever is pulled, and the lever release time may be a time from when the lever is pulled to when the lever is released. The lever pulling speed may be a ratio of the lever pulling time to a reference time. The lever pulling direction may be one of an upward direction, a downward direction, a horizontal direction and diagonal directions based on the lever design.

The lever-type door device may further include an AVN system configured to output a message that indicates a completion of the user-customization module activation. The lever-type door device may further include an AVN system configured to compare each grip pattern stored in the at least one previously registered user profile with the sensed grip pattern and provide a user interface through which the sensed grip pattern is input as a new user profile when a deviation between the grip patterns is greater than a threshold value.

A vehicle according to an exemplary embodiment of the present invention may include a sensing module configured to sense a grip pattern of an exterior handle included in a vehicle door; and a controller configured to identify a user profile that corresponds to the grip pattern and to activate a user customization module in response to the identified user profile, wherein the controller may be configured to activate the sensing module provided to a lever when a smart-key is detected.

The vehicle may further include a communication unit configured to receive a smart-key sensing signal from a smart-key system, wherein the controller may be configured to operate the vehicle door to enter a standby state and activate the sensing module in the standby state when the smart-key sensing signal is received. The controller may further be configured to search for at least one previously registered user profile using the grip pattern and output a user profile matched to the grip pattern from among searched user profiles.

The grip pattern may include at least one of a grip image pattern, an exterior handle pulling time, an exterior handle release time, an exterior handle pulling direction and an exterior handle pulling speed. The sensing module may include a plurality of contact sensors arranged at specific intervals on a sensor board mounted in the exterior handle. The sensor board may be arranged on the surface of the outside handle.

The contact sensors may include at least one of a capacitive touch electrode sensor, a resistive sensor and an optical sensor. The contact sensors may be arranged at specific intervals in a grid form. The grip image pattern may be transformed from coordinates of multi-touched contact sensors from among the plurality of contact sensors and formed on a 2D plane. The grip image pattern may include at least one sub-grip image pattern according to a combination of a plurality of fingers and a palm touches. The controller may be configured to compare each grip pattern stored in the at least one previously stored user profile with the sensed grip pattern and identify the user profile as the corresponding user profile when a deviation between the grip patterns is less than a threshold value.

The vehicle may further include a grip pattern DB for adding the sensed grip pattern to the previously stored user profile or registering the sensed grip pattern as a new user profile when the deviation between each grip pattern stored in the at least one previously registered user profile and the sensed grip pattern is greater than the threshold value. The controller may be configured to transmit control information to at least one electronic system having differently set values for different users, included in user profiles, in response to a previously registered user profile.

The user-customization module may adjust at least one of a vehicle seat position, a driving mode input to the user profile from among at least one driving mode, a height or angle of a steering wheel, a side-view mirror angle, a rearview mirror angle, brightness or color output of a cluster, a brightness output or position of a heads up display (HUD), preset radio channels and a bookmark or an address book of an AVN system in response to the user profile. The user-customization module may be an IMS.

The exterior handle pulling time may be a time from when the exterior handle is gripped to when the exterior handle is pulled, and the exterior handle release time may be a time from when the exterior handle is pulled to when the exterior handle is released. The exterior handle pulling speed may be a ratio of the exterior handle pulling time to a reference time. The exterior handle pulling direction may be one of an upward direction, a downward direction, a horizontal direction and diagonal directions based on the exterior handle design.

The vehicle may further include an AVN system configured to output a message indicating completion of activation of the user-customization module. The vehicle may further include an AVN system configured to compare each grip pattern stored in the at least one previously registered user profile with the sensed grip pattern and provide a user interface through which the sensed grip pattern may be input as a new user profile when a deviation between the grip patterns is greater than a threshold value.

The user identification method and apparatus using recognition of a lever-type door grip pattern according to the present invention have the following effects.

Firstly, according to the present invention, a driver may be recognized when the driver enters a vehicle, and thus an additional operation of the driver is not required.

Secondly, according to the present invention, a driver may be identified without a request for an additional operation of the driver, thus improving driver convenience.

Thirdly, according to the present invention, the number of drivers that may be registered is not limited and thus, a plurality of drivers may be authenticated.

Fourthly, according to the present invention, a button mounted on an exterior handle may be removed and an IMS button provided within a vehicle may also be eliminated since a grip pattern is used, mitigating limitations on the external and internal designs of the vehicle.

It will be appreciated by persons skilled in the art that the effects that may be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
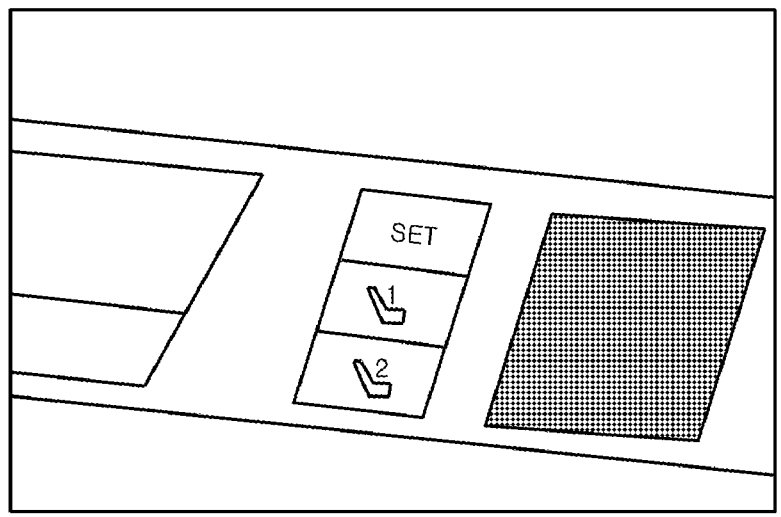
FIG. 1 is a diagram illustrating a general integrated memory system (IMS) according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The present invention will now be described in more detail through exemplary embodiments with reference to the accompanying drawings. The terms "module", "unit" or "part" used to signify components are used herein to aid in understanding of the components and thus should not be considered as having specific meanings or roles.

Although all elements of an exemplary embodiment of the invention may have been explained as assembled or operatively connected as a unit, this is exemplary only and not to be considered as a limitation of the invention. Alternatively, within the scope of the present invention, respective elements may be selectively and operatively combined in any number.

In the description of the exemplary embodiments, it will be understood that, when an element is referred to as being "on" or "under" or "in front of" or "behind" another element, it can be directly "on" or "under" or "in front of" or "behind" another element or can be indirectly arranged such that an intervening element is also present.

In the description of elements of the present invention, terms such as "first", "second", "A", "B", "(a)" and "(b)" can be used. These terms merely indicate that different instances of like elements are being referred to, and are not intended to imply that the elements so described must be in a given sequence, either temporally, spatially, in ranking, or in any other manner. In the following description and claims, when an element is "connected", "combined" or "coupled" with another element, it should be understood that the element can be directly connected or coupled with the other element, but another element may be "connected", "combined" or "coupled" between the elements.

In addition, in the following description of the present invention, a detailed description of known functions and configurations incorporated herein will be omitted when it may obscure the subject matter of the present invention.

FIG. 1 is a diagram for describing a general integrated memory system (IMS). Referring to FIG. 1, when a driver sits on a driver seat, adjusts a steering wheel position, the height and position of the seat, a rearview mirror position, side-view mirror positions and the like based on a body type or driving habit and inputs the adjustment result, the IMS may be configured to store the input information and automatically adjust the positions when the driver enters the corresponding vehicle. In other words, the IMS is a system configured to memorize the optimal driving position suited to a driver and automatically adjust the driving position to the memorized position when the driver enters the vehicle.

For example, when a driver sits on the driver seat, the IMS may be configured to detect a driver seat position, the height and depth of the steering wheel, a side-view mirror angle, cluster brightness and a head-up display position and brightness which were adjusted to be suited to the body type of the driver. The number of vehicles equipped with the IMS is increasing, and the IMS may reduce manual operation of a driver. However, a driver is currently required to previously perform an operation for registering the driver with the IMS and to operate a specific button to provide information indicating which one of registered drivers corresponds to the driver.

A driver is also required to perform a similar operation for an AVN system in addition to the IMS and to perform an operation of re-setting a driving mode in a vehicle supporting a plurality of driving modes. There is a growing number of electronic systems having different use environments (set values) for drivers, similarly to the IMS and AVN system, and it is inconvenient for a driver to set such a use environment whenever using the systems.

The present invention provides a method for identifying a driver through various sensors and automatically operating the aforementioned systems without an additional operation while a driver enters a vehicle. More specifically, the present invention provides a user identification method using recognition of a lever-type door grip pattern that detects a driver using information of various sensors without an additional driver operation and then operates electronic systems (e.g., IMS, AVN system, driving mode setting system, etc.) having differently set values for drivers in response to the recognized user.

Figure 2:
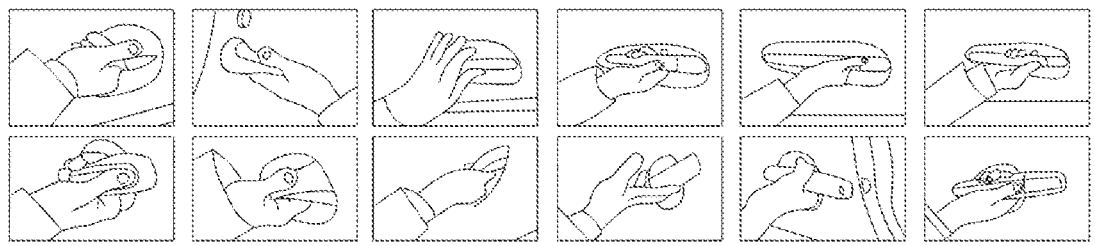
FIG. 2 is a diagram illustrating various patterns of gripping and pulling an exterior handle of a vehicle door according to an exemplary embodiment of the present invention.

FIG. 2 is a diagram illustrating various patterns of gripping and pulling an exterior handle of a vehicle door. Referring to FIG. 2, drivers may have different patterns of gripping and pulling the exterior handle attached to a vehicle door. Further, each driver may have a personal exterior handle gripping and pulling pattern based on body type (height or weight) or repeated habit.

In the present invention, an exterior handle gripping and pulling pattern of a driver is defined as "grip pattern". The grip pattern may include at least one of a contact image (referred to as "grip image pattern" hereinafter) when a driver grips the exterior handle, an exterior handle pulling time, an exterior handle release time, an exterior handle puling direction and an exterior handle pulling speed. The grip image pattern may be a 2-dimensional (2D) image. A driver may be identified more accurately by considering pulling timing, pulling direction, pulling speed and the like as time information in addition to spatial information such as the grip image pattern.

The exterior handle pulling time may be defined as a time from when the exterior handle is gripped to when the exterior handle is pulled. For example, the exterior handle pulling time may be a factor for distinguishing when the exterior handle is gripped and then immediately pulled from when the exterior handle is gripped and then pulled after a predetermined period of time (e.g., a time elapses between the grip and the pull action). The exterior handle release time may be defined as a time from when the exterior handle is pulled to when the exterior handle is released, and the exterior handle pulling speed may be defined as a ratio of the exterior handle pulling time to a reference time.

For example, the pulling speed may be a factor used to distinguish between when the exterior handle is pulled rapidly and when the exterior handle is pulled slowly (e.g., a yank versus a pull). The exterior handle pulling direction may be defined as any one of an upward direction, downward direction, horizontal direction and diagonal directions with respect to the exterior handle. It may possible to identify a driver more accurately by including a pattern of variation after gripping the exterior handle in a grip image pattern sensed when the exterior handle is pulled as an additional consideration factor for driver identification.

The present invention is not limited to the exterior handle attached to a vehicle door and may be applied to a lever-type door that has a lever. Further, the lever-type door is not limited to a door attached to a vehicle and may be applied to an entrance/exit system including a lever-type door. For example, the present invention may be applied to a lever-type door attached to a front door of a house.

Figure 3:
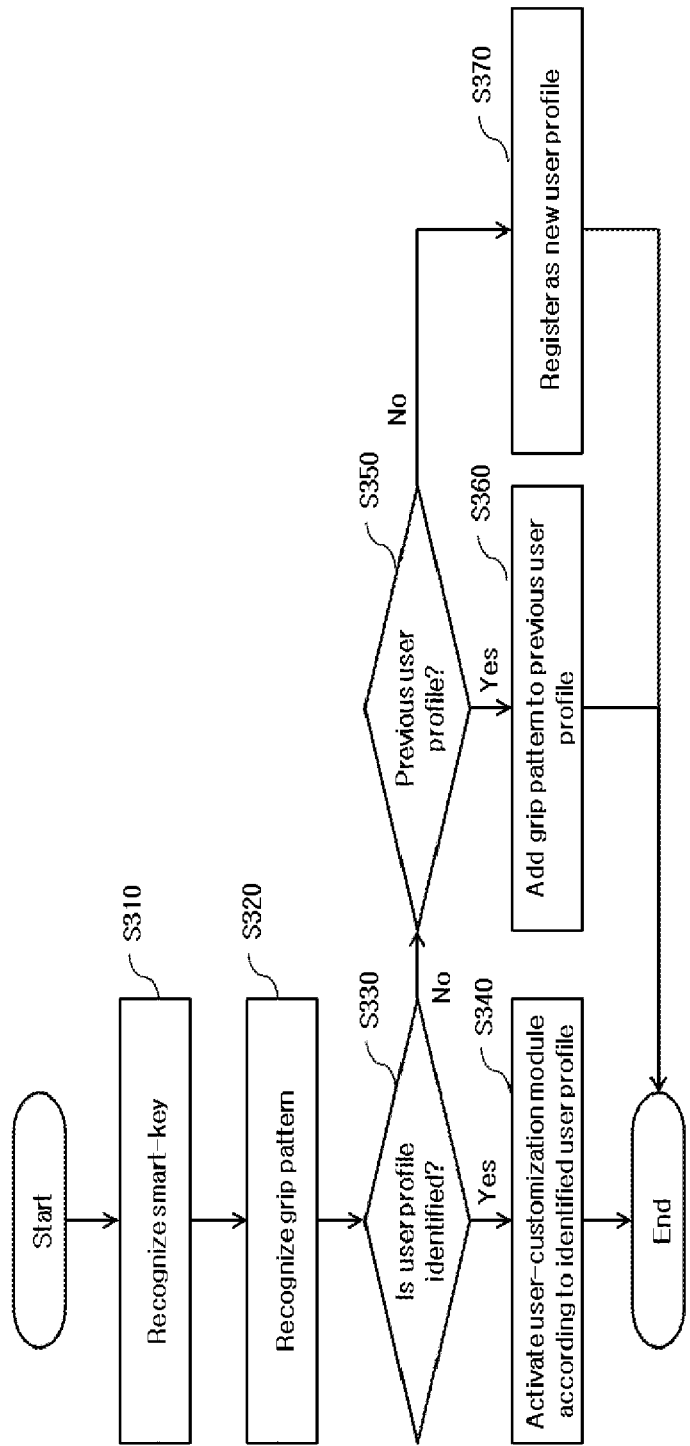
FIG. 3 is a flowchart illustrating a user identification method through recognition of a lever-type door grip pattern according to an exemplary embodiment of the present invention.

FIG. 3 is a flowchart illustrating a user identification method through recognition of a lever-type door grip pattern according to an exemplary embodiment of the present invention. The method to be described herein below with reference to FIG. 3 may be executed by a controller of the vehicle having a memory and a processor. Referring to FIG. 3, a vehicle may be configured to detect a smart-key (S310). That is, the vehicle may include a smart-key (SMK) system and may unlock vehicle doors upon recognition of the smart-key. In other words, when the smart-key is activated, the controller of the vehicle may be configured to detect the key activation.

The SMK system may be configured to perform wireless communication with the smart-key. In particular, the SMK system may be configured to receive a control signal from the smart-key and remotely perform vehicle door control, starting control and the like. The SMK system may include a wireless communication module configured to receive vehicle control signals and may perform vehicle control by checking a code included in a control signal. Meanwhile, there may be a limited area in which a vehicle may detect the smart-key outside the vehicle according to a communication scheme between the smart-key and the SMK system.

Further, the vehicle may be configured to receive identification information (e.g., smart-key ID) set to the smart-key via the smart-key and the SMK system when a driver enters the vehicle. However, the vehicle may not be capable of detecting a plurality of drivers that use the smart-key without distinguishing the drivers or detecting a change in driver. Accordingly, the present invention provides a method for identifying a driver using a grip pattern obtained when the driver grips and pulls an exterior handle to open a vehicle door. In an exemplary embodiment, the vehicle may be configured to unlock the doors upon detection of the smart-key or when a driver is identified after recognition of the smart-key.

Particularly, the vehicle may be configured to recognize a grip pattern of an exterior handle (S320). The grip pattern may be defined as a pattern of gripping and pulling the exterior handle by a driver and may include at least one of a contact image when a driver grips the exterior handle (referred to as "grip image pattern" hereinafter), an exterior handle pulling time, an exterior handle release time, an exterior handle pulling direction and an exterior handle pulling speed. The vehicle may be configured to operate the doors to enter a standby state upon sensing the smart-key. Since a substantial amount of power is consumed when a sensing module is always in an activated state, the vehicle may be configured to activate the sensing module disposed within the exterior handle by supplying predetermined power to the doors in the standby state.

The activated sensing module may include a plurality of contact sensors arranged at specific intervals on a sensor board mounted in the exterior handle. The sensing module may include the sensor board and the contact sensors arranged at specific intervals in a grid form. The vehicle may be configured to identify a relevant user profile from among at least one previously stored user profile using the grip pattern recognized by the sensing module (S330). A user profile may be generated per driver having the authority to use the vehicle.

The vehicle may include a grip pattern database (DB). The grip pattern DB may include at least one driver profile, and each driver profile may store identification information (driver name) for identifying each driver, set values of an electronic system having differently set values for drivers, a grip pattern matched thereto and stored therein, a sub-grip pattern classified per category, and the like. In other words, the grip pattern DB stores at least one driver profile, and each driver profile stores setting information of an electronic system having differently set values for drivers. The vehicle may be configured to search for a relevant driver profile using the recognized grip pattern and output the searched driver profile.

Whenever a driver grips the exterior handle, a grip pattern may be accumulated and stored. An average image of information of the accumulated grip patterns may be calculated to improve a driver profile recognition rate. The vehicle may then be configured to compare grip patterns stored in the at least one previously registered user profile with the sensed grip pattern and identify the user profile as the relevant user profile when a deviation between the grip patterns is less than a threshold value ("YES" of S330). The vehicle may be configured to activate a user-customization module upon identification of the relevant user profile and transmit set values that correspond to the identified user profile to the electronic system (S340). For example, the threshold value may be a 95% and accordingly, the deviation ratio between the grip pattern stored in the user profile and the sensed grip pattern should be 95% or greater such that the use profile is capable of being identified. However, the present invention is not limited thereto and a grip pattern having a deviation ratio N (N>2, N being an integer) time or greater of the plurality of grip patterns stored in the user profile may be identified as a corresponding user profile.

In an exemplary embodiment, the user-customization module may be an IMS or an AVN system. The vehicle may be configured to operate each electronic system having differently set values for users in response to a previously registered user profile. For example, the vehicle may be configured to operate and adjust at least one of a vehicle seat position, a driving mode input to the user profile from among at least one driving mode, the height or angle of the steering wheel, a side-view mirror angle, a rearview mirror angle, brightness or color output of the cluster, head up display (HUD) brightness output or position, preset radio channels, and bookmark or address book of the AVN system.

When the deviation between the grip patterns stored in the at least one previously stored user profile and the sensed grip pattern is equal to or greater than the threshold value ("NO" of S330), the vehicle may be configured to add the sensed grip pattern to the previously registered user profile (S360) or register the sensed grip pattern as a new user profile (S370). The driver may then select a user profile previously registered and add the sensed grip pattern using a user interface of the AVN system upon entering the vehicle. A new driver may enter the vehicle and additionally register as a new driver through a new driver profile using the user interface of the AVN system.

Figure 4:
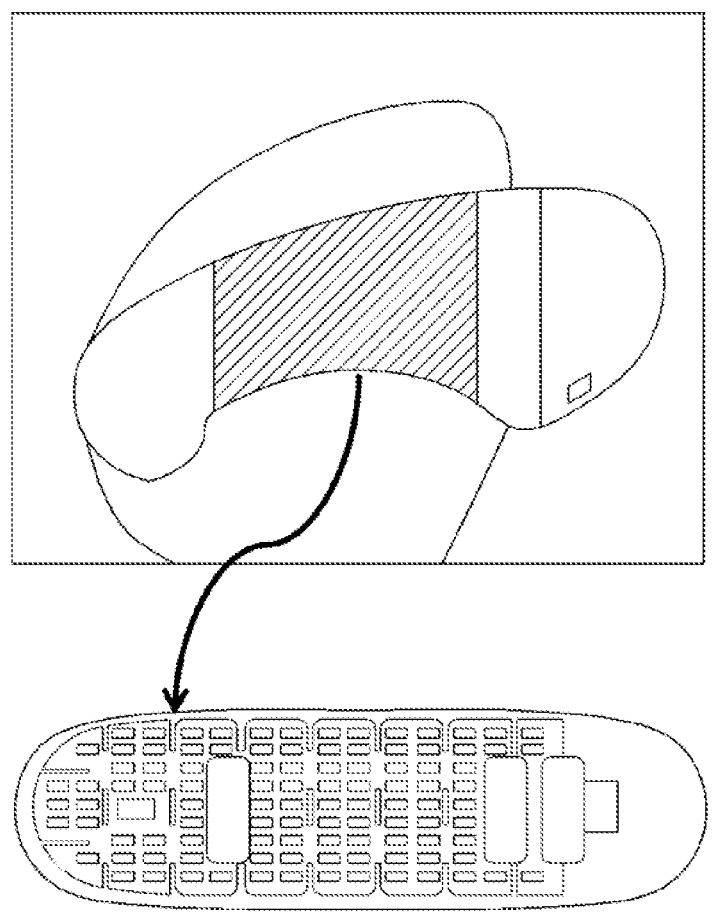
FIG. 4 is a diagram illustrating a sensing module for recognizing a lever-type door grip pattern according to an exemplary embodiment of the present invention.

FIG. 4 is a diagram illustrating a sensing module configured to detect a grip pattern of a lever-type door according to an exemplary embodiment of the present invention. Referring to FIG. 4, a vehicle may include an exterior handle attached to a vehicle door and a sensing module disposed within the exterior handle. The sensing module may be arranged on the entire area of the exterior handle or arranged at the center of the exterior handle as illustrated in FIG. 4.

The sensing module may include a plurality of contact sensors arranged at specific intervals on a sensor board mounted in the exterior handle, and the sensor board may be arranged on the surface of the lever. In an exemplary embodiment, the contact sensors may be arranged at specific intervals in a grid form. The contact sensor may include at least one of a capacitive touch electrode sensor, a resistive sensor, and an optical sensor. However, the contact sensor is not limited thereto and may be any sensor capable of sensing contact of the exterior handle by a driver.

Figure 5:
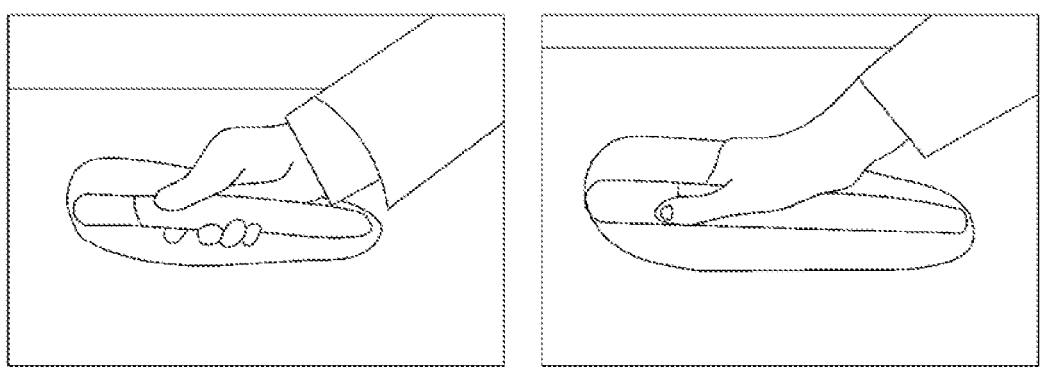
FIG. 5 is a diagram illustrating different grip image patterns of users according to an exemplary embodiment of the present invention.
Figure 5:
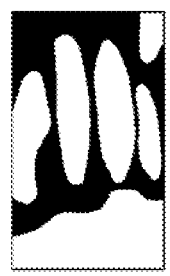
Figure 5:

FIG. 5 is a diagram illustrating different grip image patterns of drivers according to an exemplary embodiment of the present invention. Referring to FIG. 5, drivers may have different grip patterns, particularly, different grip image patterns.

In particular, the grip image pattern may be an image transformed from coordinates of multi-touched contact sensors from among the plurality of contact sensors and formed on the 2D plane. In an exemplary embodiment, the grip image pattern may include a 3-dimensional (3D) image that represents gripping the exterior handle since the exterior handle has a 3-dimensional shape. The sensing module may be configured to obtain a grip image pattern from the contact sensors. The contact sensors may be configured to generate row data regarding a contact pattern, and the generated raw data may generate an image similar to an actual grip of the exterior handle using an interpolation process. The sensing module may represent contact sensors sensed using multi-touch recognition as coordinates and indicate sequentially sensed contact sensors as a matrix.

In an exemplary embodiment, a vehicle may be configured to distinguish between fingers and a palm of a driver from a grip image pattern. The grip image pattern may include at least one sub-grip image pattern based on a combination of fingers and a palm (e.g., combination of different hand parts in the touch of the handle). For example, the vehicle may be configured to categorize gripping the exterior handle using five fingers and gripping the exterior handle using only four fingers and classify sub-grip image patterns by the categories.

Figure 6:
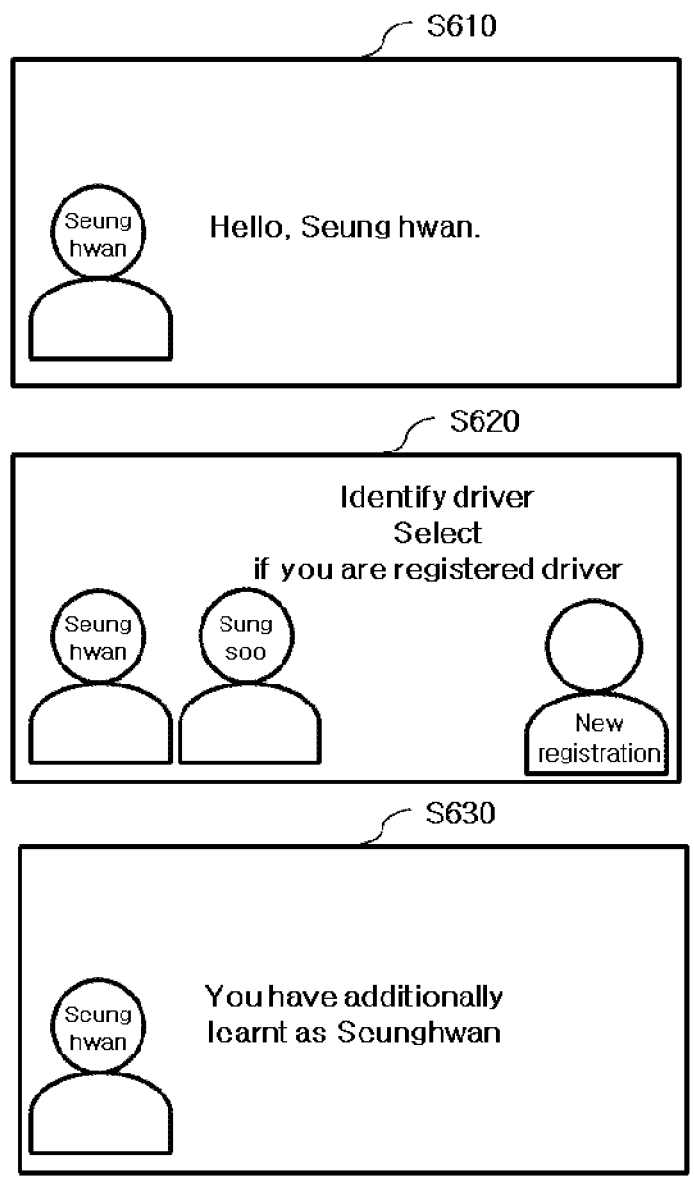
FIG. 6 is a diagram illustrating an AVN system which outputs messages for ordering driver identification and registration according to an exemplary embodiment of the present invention.

FIG. 6 is a diagram illustrating an AVN system which outputs messages for requesting driver identification and registration according to an exemplary embodiment of the present invention. Referring to FIG. 6, S610 is a message for instructing a driver to complete activation of the user-customization module when a vehicle identifies a user profile that corresponds to a recognized grip pattern. The message may be output via an output module of the AVN system. For example, the message may be output on a display device or using a speaker.

In particular, the message for instructing a driver to complete activation may be output through display devices other than the output module of the AVN system. S620 is a message indicating that identification is impossible when a user profile that corresponds to a recognized grip pattern is not identified. When a driver profile of a user has been registered, the user may add a recognized grip pattern to the driver profile. S630 is a message indicating that a newly added grip pattern has been stored. When a user has not been registered as a new driver through a driver profile, the user may newly register the driver profile. In other words, the controller may be configured to receive registration information, new registration information, and the like and process the information to store the information in the database.

Figure 7:
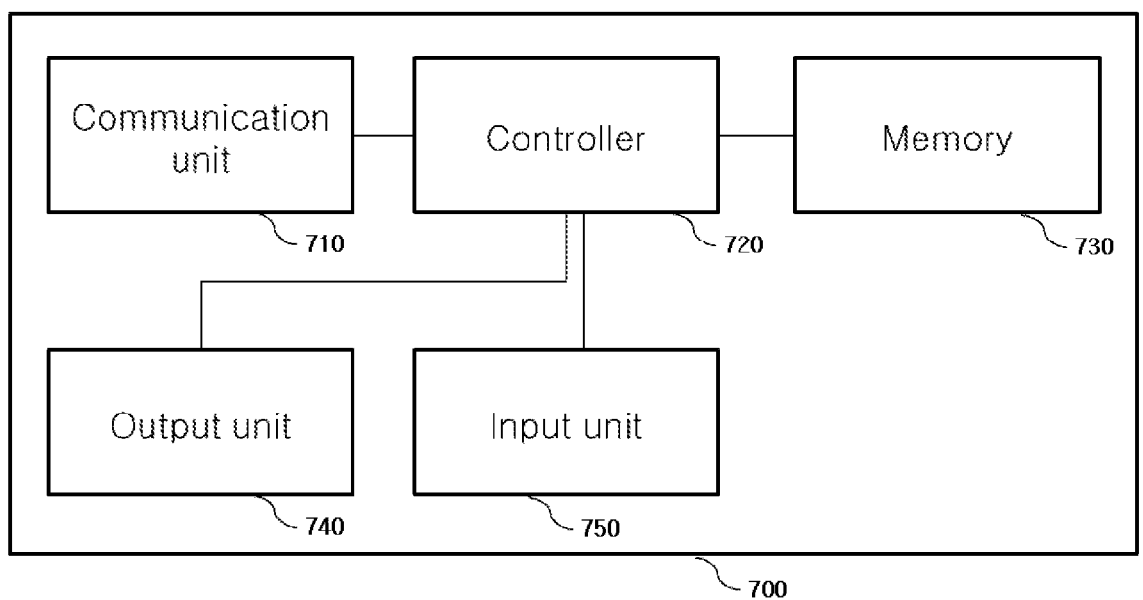
FIG. 7 is a block diagram illustrating a user identification apparatus through recognition of a lever-type door grip pattern according to an exemplary embodiment of the present invention.

FIG. 7 is a block diagram illustrating a user identification apparatus using recognition of a lever-type door grip pattern according to an exemplary embodiment of the present invention. Referring to FIG. 7, a user identification apparatus 700 may include a communication unit 710, a controller 720, a memory 730, an output unit 740 and an input unit 750. The controller 720 may be configured to operate the other components of the identification apparatus 700.

The components illustrated in FIG. 7 are not mandatory and the user identification apparatus 700 may have more or fewer components than the illustrated components. In particular, the communication unit 710 may be configured to transmit control signals to various electronic systems of a vehicle via vehicle communication. When the communication unit 710 receives a driver profile identification signal from the controller 720, the communication unit 710 may be configured to transmit a set value to each electronic system in response to a driver profile that corresponds to the driver profile identification signal. The communication unit 710 may include a wireless communication module and may be configured to detect a smart-key via the wireless communication module.

The controller 720 may be configured to perform data processing to operate the user identification apparatus 700. Particularly, the controller 720 may be configured to search for a user profile that matches a grip pattern received from the sensing module using the grip pattern and output the searched user profile. The memory 730 is a general term for a space and/or a region in which predetermined program code for executing the overall operation of the user identification apparatus 700 and data input/output when operation according to the program code is performed may be stored and is provided in the form of an electrically erasable and programmable read only memory (EEPROM), a flash memory (FM), hard disk drive or the like. In an exemplary embodiment, the memory 730 may include a grip pattern database (DB).

Further, the output unit 740 and the input unit 750 may provide user interfaces through which a driver may input a user profile in the vehicle (e.g., through which a controller may receive the information) and provide processing result through the user interfaces. Although the user identification apparatus 700 may include the output unit 740 and the input unit 750, the user identification apparatus 700 may provide a user interface using an input/output device of the AVN system in an exemplary embodiment. A control signal may be generated through a button UI selected by a driver.

Those skilled in the art will appreciate that the present invention may be executed in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A user identification method using recognition of a grip pattern of a lever-type door, comprising:

sensing, by a controller, a grip pattern using a sensing module;

identifying, by the controller, a user profile that corresponds to the grip pattern;

activating, by the controller, a user-customization module in response to the identified user profile; and activating, by the controller, the sensing module disposed in a lever of a vehicle door when a smart-key is detected, wherein the grip pattern includes a grip image pattern, wherein the lever-type door is a vehicle door and the lever is an exterior handle mounted on the vehicle door, and wherein the grip image pattern includes a 3-dimensional (3D) image that represents gripping the exterior handle.

2. The user identification method according to claim 1, wherein the activating of the sensing module includes:
operating, by the controller, the lever-type door in a standby state when the smart-key is detected; and
activating, by the controller, the sensing module when the lever-type door is in the standby state.

3. The user identification method according to claim 1, wherein the identifying of a user profile that corresponds to the grip pattern includes:
searching, by the controller, for at least one previously registered user profile using the grip pattern; and
outputting, by the controller, a user profile matched to the grip pattern from among searched user profiles.

4. The user identification method according to claim 1, wherein the grip pattern further includes at least one selected from the group consisting of: a lever pulling time, a lever release time, a lever pulling direction, and a lever pulling speed.

5. The user identification method according to claim 1, wherein the sensing module includes a plurality of contact sensors arranged at specific intervals on a sensor board mounted in the lever.

6. The user identification method according to claim 4, wherein the grip image pattern is transformed from coordinates of multi-touched contact sensors from among the plurality of contact sensors and formed on a 2-dimensional plane.

7. The user identification method according to claim 1, wherein the identifying of the user profile includes:
comparing, by the controller, each grip pattern stored in the at least one previously stored user profile with the sensed grip pattern; and
identifying, by the controller, the user profile as the corresponding user profile when a deviation between the grip patterns is less than a threshold value.

8. The user identification method according to claim 7, further comprising:
adding, by the controller, the sensed grip pattern to the previously stored user profile or registering the sensed grip pattern as a new user profile when the deviation between each grip pattern stored in the at least one previously registered user profile and the sensed grip pattern is greater than the threshold value.

9. The user identification method according to claim 1, wherein the activating of the user-customization module includes:
operating, by the controller, at least one electronic system having differently set values for different users, included in user profiles, in response to a previously registered user profile.

10. The user identification method according to claim 9, wherein the operating of at least one electronic system having differently set values for different users, included in user profiles, in response to a previously registered user profile includes:
adjusting at least one selected from the group consisting of: a vehicle seat position, a driving mode input to the user profile from among at least one driving mode, a height or angle of a steering wheel, a side-view mirror angle, brightness or color output of a cluster, a brightness output or position of a heads up display (HUD), preset radio channels, and a bookmark or an address book of an AVN system.

11. The user identification method according to claim 4, wherein the lever pulling time is a time from when the lever is gripped to when the lever is pulled, the lever release time is a time from when the lever is pulled to when the lever is released, the lever pulling direction is one of an upward direction, a downward direction, a horizontal direction and diagonal directions based on a lever design, and the lever pulling speed is a ratio of the lever pulling time to a reference time.

12. The user identification method according to claim 1, further comprising:
comparing, by the controller, each grip pattern stored in the at least one previously registered user profile with the sensed grip pattern; and
inputting, by the controller, the sensed grip pattern as a new user profile through a user interface of an audio video navigation (AVN) system when a deviation between the grip patterns is greater than a threshold value.

13. A lever-type door device, comprising:
a sensing module configured to sense a grip pattern; and
a controller configured to identify a user profile that corresponds to the grip pattern and to activate a user customization module in response to the identified user profile,
wherein the controller is configured to activate the sensing module disposed within a lever of a vehicle door when a smart-key is sensed,
wherein the grip pattern includes a grip image pattern,
wherein the lever-type door is a vehicle door and the lever is an exterior handle mounted on the vehicle door, and
wherein the grip image pattern includes a 3-dimensional (3D) image that represents gripping the exterior handle.

14. The lever-type door device according to claim 13, further comprising:
a communication unit configured to receive a smart-key sensing signal from a smart-key system,
wherein the controller is configured to operate a lever-type door to enter a standby state and activate the sensing module in the standby state when the smart-key sensing signal is received.

15. The lever-type door device according to claim 13, wherein the controller is configured to search for at least one previously registered user profile using the grip pattern and output a user profile matched to the grip pattern from among searched user profiles.

16. The lever-type door device according to claim 13, wherein the grip pattern further includes at least one selected from the group consisting of: a lever pulling time, a lever release time, a lever pulling direction and a lever pulling speed.

17. The lever-type door device according to claim 13, wherein the sensing module includes a plurality of contact sensors arranged at specific intervals on a sensor board mounted in the lever.

18. The lever-type door device according to claim 16, wherein the grip image pattern is transformed from coordinates of multi-touched contact sensors from among the plurality of contact sensors and formed on a 2-dimensional plane.

19. The lever-type door device according to claim 13, wherein the controller is configured to compare each grip pattern stored in the at least one previously stored user profile with the sensed grip pattern and identify the user profile as the corresponding user profile when a deviation between the grip patterns is less than a threshold value.

20. The lever-type door device according to claim 13, further comprising:

a grip pattern database for adding the sensed grip pattern to the previously stored user profile or registering the sensed grip pattern as a new user profile when the deviation between each grip pattern stored in the at least one previously registered user profile and the sensed grip pattern is greater than the threshold value.

21. The lever-type door device according to claim 13, wherein the controller is configured to transmit control information to at least one electronic system having different set values for different users, included in user profiles, in response to a previously registered user profile.

22. The lever-type door device according to claim 21, wherein the user-customization module is configured to operate at least one selected from the group consisting of: a vehicle seat position, a driving mode input to the user profile from among at least one driving mode, a height or angle of a steering wheel, a side-view mirror angle, a rearview mirror angle, brightness or color output of a cluster, a brightness output or position of a heads up display (HUD), preset radio channels, and a bookmark or an address book of an audio video navigation (AVN) system in response to the user profile.

23. The lever-type door device according to claim 16, wherein the lever pulling time is a time from when the lever is gripped to when the lever is pulled, the lever release time is a time from when the lever is pulled to when the lever is released, the lever pulling direction is one of an upward direction, a downward direction, a horizontal direction and diagonal directions based on a lever design, and the lever pulling speed is a ratio of the lever pulling time to a reference time.

24. The lever-type door device according to claim 13, further comprising: an audio video navigation (AVN) system configured to compare each grip pattern stored in the at least one previously registered user profile with the sensed grip pattern and provide a user interface through which the sensed grip pattern is input as a new user profile when a deviation between the grip patterns is greater than a threshold value.

* * * * *